United States Patent [19]

Betz et al.

[11] 4,197,320

[45] Apr. 8, 1980

[54] CITRIC ACID IN HORSE FEEDS

[75] Inventors: Norman L. Betz, St. Louis, Mo.; Kent J. Lanter, Belleville, Ill.

[73] Assignee: Ralston Purina Company, St. Louis, Mo.

[21] Appl. No.: 878,344

[22] Filed: Feb. 16, 1978

[51] Int. Cl.$^2$ .............................................. A23K 1/00
[52] U.S. Cl. ........................................ 426/2; 426/302; 426/623; 426/630; 426/635; 426/636; 426/807
[58] Field of Search ................. 426/2, 302, 635, 636, 426/630, 807, 623

[56] References Cited

U.S. PATENT DOCUMENTS

| | | | |
|---|---|---|---|
| 3,679,429 | 7/1972 | Mohrman et al. | 426/805 |
| 3,930,031 | 12/1975 | Kealy | 426/805 |
| 3,946,115 | 3/1976 | Breuer et al. | 426/623 |

FOREIGN PATENT DOCUMENTS 560490 7/1958 Canada ................................. 426/805

*Primary Examiner*—R. B. Penland
*Attorney, Agent, or Firm*—W. Dennis Drehkoff; Veo Peoples, Jr.

[57] ABSTRACT

A uniquely palatable horse feed is prepared by employing certain prescribed amounts of citric acid in the feed.

12 Claims, No Drawings

CITRIC ACID IN HORSE FEEDS

BACKGROUND OF THE INVENTION

This invention relates generally to horse feeds and feeding and specifically to the use of citric acid therein.

Unsoundness of horses has been attributed to many things including inheritance, accident, injury and overwork. However, nutritional deficiency has also been considered a problem in the past. All too often, this nutritional deficiency has been caused by the horses' failure to consume a nutritionally adequate amount of feed during his feeding periods.

Accordingly, flavoring aids and palatability enhancers have gained wide acceptance in the industry. Although additives such as licorice root, anise oil, monosodium glutamate, ginger, vanillin and molasses have been employed with limited degrees of success, there still remains a need for even more palatable feeds.

SUMMARY OF THE INVENTION

Citric acid is utilized in horse feeds at a level of from about 0.3% to about 0.001% by weight of the feed to provide a unique feed of substantially enhanced palatability.

DESCRIPTION OF THE PREFERRED EMBODIMENTS

In accordance with the present invention, citric acid when added to all classifications of horse feeds will result in improved palatability. The feeds are generally indexed according to the percentage of total digestible nutrients such as carbohydrates, fats and proteins. Accordingly, the feeds of this invention will include, for example, concentrates which contain at least 75% total digestible nutrients but are low in fiber (less than 10%), and roughage which is low in total digestible nutrients but proportionately high in fiber. The concentrates may be carbonaceous concentrates which are low in protein but high in energy value or the concentrates may be protein supplements which as the name implies are higher in protein. The roughage may be green roughage (pasturage) or dry roughage of all types.

Cereal grains such as oats, corn, barley, grain sorghum, wheat and rye are commonly used as carbonaceous supplements while beet pulp, molasses and wheat bran may be employed in varying amounts to provide higher energy values. The protein supplements may be derived from legume seeds such as soybeans and field peas or from by-product sources such as linseed oil meal, cottonseed meal, soybean meal and corn gluten feed and meal.

The preferred basal ration contains 40-50% roughage source, 10-20% wheat by-products, 10-20% soybean meal, and 10-20% corn or other grains and as desired minor amounts of molasses, vitamins and minerals.

In the preparation of conventional horse rations the feed ingredients are milled, blended and pressed into pellets through for example, a pellet mill. For such rations the citric acid may be coated over the exterior of the pellets, however, it is preferred for purposes of handling and effectiveness that the citric acid be blended with the basal ingredients of the feed. When applied on the inside of the ration the amount of citric acid should range from about 0.3% to about 0.001% by weight of the ration, preferably as low as is effective to maintain an intake of between 8 and 18 lbs per head per day. When coated over the feed the amount of citric can be coated in an oil coating. Citric acid may also be employed at the previously described levels in the extruded horse rations of U.S. Pat. No. 3,946,115.

The following example is not intended to limit the scope of this invention but will more clearly illustrate its best mode of operation.

EXAMPLE 1

A ration containing the following ingredients was milled, blended and pressed into pellets in a pellet mill and was utilized as the control:

| CONTROL | |
| --- | --- |
| Roughage | 40-50% |
| Wheat by-products | 10-20% |
| Soybean meal | 10-20% |
| Corn | 10-20% |
| Molasses, vitamins & minerals | less than 1% |

An identical formula was prepared containing 0.015% citric acid and was used as the test ration. Thirteen yearling quarter horse fillies were fed in separate stalls over a 14 day period. Each day two feeders were placed in each stall twice a day for 30 minutes each feeding period. One feeder contained the control and the other contained the test ration and the daily consumption of each horse from each feeder was recorded in order to test preference. The resulting consumption data are as follows:

| | Horse 1 | | | Horse 2 | |
| --- | --- | --- | --- | --- | --- |
| DAY | (#) CONTROL | (#) TEST | DAY | (#) CONTROL | (#) TEST |
| 1 | 3.4 | 10.0 | 1 | 0.8 | 14.7 |
| 2 | 2.0 | 11.5 | 2 | 0.6 | 11.5 |
| 3 | 3.2 | 11.3 | 3 | 2.1 | 16.5 |
| 4 | 4.0 | 9.3 | 4 | 6.0 | 10.4 |
| 5 | 6.9 | 10.2 | 5 | 0.2 | 15.0 |
| 6 | 3.0 | 11.0 | 6 | 0.2 | 15.6 |
| 7 | 2.2 | 10.1 | 7 | 0 | 15.2 |
| 8 | 2.4 | 10.1 | 8 | 0.1 | 14.0 |
| 9 | 1.2 | 11.3 | 9 | 0.5 | 15.7 |
| 10 | 3.0 | 9.3 | 10 | 0.1 | 14.0 |
| 11 | 4.4 | 9.6 | 11 | 1.0 | 16.5 |
| 12 | 4.2 | 9.8 | 12 | 4.9 | 9.3 |
| 13 | 4.9 | 7.7 | 13 | 3.9 | 11.2 |
| 14 | 5.4 | 8.5 | 14 | 2.7 | 14.0 |

| | Horse 3 | | | Horse 4 | |
| --- | --- | --- | --- | --- | --- |
| DAY | # CONTROL | # TEST | DAY | # CONTROL | # TEST |
| 1 | 2.1 | 9.1 | 1 | 3.8 | 6.5 |
| 2 | 0.9 | 5.4 | 2 | 2.2 | 7.8 |
| 3 | 1.7 | 10.1 | 3 | 5.0 | 7.6 |
| 4 | 2.5 | 10.4 | 4 | 5.2 | 9.5 |
| 5 | 1.5 | 11.8 | 5 | 3.5 | 9.3 |
| 6 | 2.7 | 11.9 | 6 | 4.3 | 10.1 |
| 7 | 1.4 | 11.4 | 7 | 4.2 | 8.5 |
| 8 | 1.9 | 12.2 | 8 | 3.2 | 9.1 |
| 9 | 1.5 | 12.5 | 9 | 4.2 | 8.6 |
| 10 | 1.5 | 12.5 | 10 | 3.5 | 9.7 |
| 11 | 1.7 | 13.1 | 11 | 4.9 | 9.7 |
| 12 | 2.9 | 12.1 | 12 | 1.3 | 10.2 |
| 13 | 2.1 | 12.0 | 13 | 0.9 | 10.8 |
| 14 | 2.4 | 12.2 | 14 | 0.9 | 12.1 |

| | Horse 5 | | | Horse 6 | |
| --- | --- | --- | --- | --- | --- |
| DAY | (#) CONTROL | (#) TEST | DAY | (#) CONTROL | (#) TEST |
| 1 | 2.2 | 9.4 | 1 | 3.0 | 7.7 |
| 2 | 0 | 4.9 | 2 | 2.7 | 6.8 |

-continued

| DAY | # CONTROL | # TEST | DAY | # CONTROL | # TEST |
|---|---|---|---|---|---|
| 3 | 3.4 | 10.2 | 3 | 0.5 | 11.4 |
| 4 | 1.7 | 12.5 | 4 | 1.6 | 10.3 |
| 5 | 3.4 | 8.0 | 5 | 1.4 | 9.7 |
| 6 | 1.6 | 12.7 | 6 | 3.4 | 8.8 |
| 7 | 0.5 | 13.2 | 7 | 2.1 | 9.9 |
| 8 | 0 | 13.7 | 8 | 4.8 | 6.9 |
| 9 | 0.1 | 12.3 | 9 | 1.6 | 10.6 |
| 10 | 0.1 | 11.7 | 10 | 5.3 | 5.0 |
| 11 | 0.3 | 13.0 | 11 | 4.0 | 8.2 |
| 12 | 0 | 11.6 | 12 | 7.7 | 4.1 |
| 13 | 0.2 | 12.9 | 13 | 6.4 | 6.0 |
| 14 | 0.3 | 14.2 | 14 | 3.1 | 9.0 |

| Horse 7 | | | Horse 8 | | |
|---|---|---|---|---|---|
| DAY | # CONTROL | # TEST | DAY | # CONTROL | # TEST |
| 1 | 2.4 | 12.8 | 1 | 1.4 | 13.3 |
| 2 | 3.5 | 13.4 | 2 | 1.3 | 14.2 |
| 3 | 6.4 | 13.5 | 3 | 6.6 | 10.1 |
| 4 | 0.9 | 15.4 | 4 | 2.2 | 15.1 |
| 5 | 2.9 | 12.4 | 5 | 1.6 | 13.5 |
| 6 | 2.4 | 16.5 | 6 | 1.5 | 15.8 |
| 7 | 2.4 | 14.7 | 7 | 2.5 | 14.9 |
| 8 | 2.0 | 15.6 | 8 | 1.2 | 16.8 |
| 9 | 3.4 | 13.4 | 9 | 2.5 | 15.7 |
| 10 | 3.0 | 14.4 | 10 | 1.7 | 14.8 |
| 11 | 6.1 | 11.9 | 11 | 1.6 | 14.9 |
| 12 | 3.5 | 13.9 | 12 | 3.0 | 15.0 |
| 13 | 4.0 | 13.3 | 13 | 0.6 | 15.5 |
| 14 | 3.5 | 14.3 | 14 | 1.0 | 16.2 |

| Horse 9 | | | Horse 10 | | |
|---|---|---|---|---|---|
| DAY | (#) CONTROL | (#) TEST | DAY | (#) CONTROL | (#) TEST |
| 1 | 1.3 | 12.2 | 1 | 6.6 | 9.0 |
| 2 | 1.2 | 14.7 | 2 | 5.0 | 11.8 |
| 3 | 3.0 | 15.6 | 3 | 6.5 | 12.1 |
| 4 | 3.1 | 14.3 | 4 | 4.0 | 13.1 |
| 5 | 4.5 | 12.5 | 5 | 4.4 | 12.0 |
| 6 | 3.1 | 15.6 | 6 | 3.5 | 15.0 |
| 7 | 2.2 | 13.5 | 7 | 4.6 | 12.1 |
| 8 | 3.1 | 15.5 | 8 | 4.2 | 11.3 |
| 9 | 2.7 | 12.4 | 9 | 5.2 | 11.8 |
| 10 | 2.4 | 14.5 | 10 | 7.2 | 9.2 |
| 11 | 6.2 | 12.7 | 11 | 6.7 | 11.8 |
| 12 | 7.5 | 8.8 | 12 | 7.6 | 8.6 |
| 13 | 8.7 | 9.1 | 13 | 3.0 | 13.4 |
| 14 | 9.3 | 11.0 | 14 | 4.3 | 13.8 |

| Horse 11 | | | Horse 12 | | |
|---|---|---|---|---|---|
| DAY | # CONTROL | # TEST | DAY | # CONTROL | # TEST |
| 1 | 1.5 | 12.0 | 1 | 0.5 | 16.6 |
| 2 | 0.9 | 13.9 | 2 | 2.0 | 16.2 |
| 3 | 3.4 | 14.4 | 3 | 2.1 | 17.3 |
| 4 | 0.6 | 11.9 | 4 | 4.3 | 14.6 |
| 5 | 4.6 | 10.2 | 5 | 2.1 | 14.5 |
| 6 | 0.4 | 15.3 | 6 | 1.8 | 16.4 |
| 7 | 4.5 | 9.0 | 7 | 1.4 | 14.9 |
| 8 | 5.5 | 10.8 | 8 | 7.3 | 11.7 |
| 9 | 8.0 | 4.3 | 9 | 1.8 | 15.6 |
| 10 | 0.7 | 13.0 | 10 | 2.6 | 14.4 |
| 11 | 3.7 | 10.2 | 11 | 2.9 | 15.5 |
| 12 | 1.0 | 10.8 | 12 | 5.0 | 12.8 |
| 13 | 3.6 | 11.2 | 13 | 1.8 | 17.0 |
| 14 | 2.7 | 10.4 | 14 | 3.7 | 15.3 |

| Horse 13 | | |
|---|---|---|
| DAY | (#) CONTROL | (#) TEST |
| 1 | 0.7 | 13.6 |
| 2 | 1.3 | 14.8 |
| 3 | 0.6 | 16.6 |
| 4 | 0.5 | 16.1 |
| 5 | 0.5 | 13.8 |
| 6 | 1.0 | 16.5 |
| 7 | 1.2 | 14.3 |
| 8 | 2.4 | 14.3 |
| 9 | 0.9 | 14.9 |
| 10 | 0.8 | 14.6 |
| 11 | 1.9 | 15.1 |
| 12 | 2.5 | 12.8 |
| 13 | 1.9 | 9.3 |
| 14 | 1.9 | 11.6 |

The results are quite dramatic. Out of 182 choices (14 horses × 13 days) the horses preferred the test over the control 178 times. Of the 4 remaining times the same horse accounted for 3 of those occasions, twice of which the difference was less than one pound. Clearly citric acid provided uniquely superior palatability.

What is claimed is:

1. An improved horse feed comprising nutritionally balanced feed ingredients including about 20 to about 40% by weight carbonaceous concentrates, about 10 to about 20% by weight protein supplements, and about 40 to 50% by weight roughage, and mixtures thereof;
    the improvement comprising from about 0.3% to about 0.001% citric acid to enhance the palatability of the feed to a point that horses consume between 8 and 18 pounds per head per day of the feed.

2. The product of claim 1 wherein the amount of citric acid is 0.015%.

3. The product of claim 1 wherein the amount of citric acid is 0.3%.

4. A method of substantially improving the palatability of nutritionally balanced horse feeds, the improvement comprising adding about 0.3% to 0.001% citric acid by weight to the feed to improve the palatability thereof.

5. The method of claim 4 wherein the improved feed is produced by milling the ingredients, blending them and pelleting the mixture through a pellet mill.

6. The method of claim 4 wherein the feed is an extruded feed.

7. The method of claim 4 wherein the citric acid is coated over the feed.

8. The method of claim 4 further comprising feeding the feed to horses.

9. The method of claim 4 wherein the amount of citric acid is 0.015%.

10. The method of claim 4 wherein the amount of citric acid is 0.3%.

11. An improved method of making a horse feed manufactured by milling and blending nutritionally balanced amounts of ingredients selected from the group consisting of carbonaceous ingredients, protein supplements, fiber, roughage and mixtures thereof, and pelleting the ingredients; the improvement comprising:
    adding to the ingredients, prior to pelleting, about 0.015% citric acid by weight of the mixture;
    whereby the feed is substantially more palatable.

12. The improved horse feed of claim 1 wherein it is extruded.

* * * * *